(12) United States Patent
Shimano et al.

(10) Patent No.: US 6,947,377 B1
(45) Date of Patent: Sep. 20, 2005

(54) PATH NETWORK AND PATH NETWORK OPERATION METHOD USING CONVERSION OF PROTECTION PATH INTO WORKING PATH

(75) Inventors: Katsuhiro Shimano, Kanagawa-ken (JP); Satoru Okamoto, Kanagawa-ken (JP); Atsushi Watanabe, Kanagawa-ken (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 698 days.

(21) Appl. No.: 09/698,884

(22) Filed: Oct. 28, 2000

(30) Foreign Application Priority Data

Oct. 29, 1999 (JP) ............................. P11-308973

(51) Int. Cl.⁷ ............................................. H04L 12/26
(52) U.S. Cl. ..................... 370/228; 370/227; 370/244; 370/522; 398/5; 340/2.1; 340/825.01
(58) Field of Search ................................ 370/216, 225, 370/227, 228, 244, 522; 340/825.01, 2.1; 398/5; 714/4

(56) References Cited

U.S. PATENT DOCUMENTS

| | | | | |
|---|---|---|---|---|
| 5,495,472 A | * | 2/1996 | Ohara | 370/224 |
| 5,721,727 A | * | 2/1998 | Ashi et al. | 370/244 |
| 5,848,055 A | * | 12/1998 | Fedyk et al. | 370/228 |
| 5,901,137 A | * | 5/1999 | Nakabayashi | 370/222 |
| 5,974,027 A | * | 10/1999 | Chapman | 370/228 |
| 6,246,667 B1 | * | 6/2001 | Ballintine et al. | 370/224 |
| 6,317,426 B1 | * | 11/2001 | Afanador et al. | 370/352 |
| 6,477,142 B1 | * | 11/2002 | Remein | 370/222 |
| 6,532,088 B1 | * | 3/2003 | Dantu et al. | 398/43 |
| 6,535,529 B1 | * | 3/2003 | Ichihashi | 370/535 |
| 6,574,192 B1 | * | 6/2003 | Egnell | 370/224 |
| 6,606,297 B1 | * | 8/2003 | Magill et al. | 370/216 |
| 6,616,350 B1 | * | 9/2003 | de Boer et al. | 398/9 |
| 6,643,041 B1 | * | 11/2003 | Ikeda et al. | 398/79 |
| 6,643,464 B1 | * | 11/2003 | Roorda et al. | 398/59 |
| 6,657,952 B1 | * | 12/2003 | Shiragaki et al. | 370/223 |
| 6,775,477 B2 | * | 8/2004 | Badr | 398/1 |

* cited by examiner

*Primary Examiner*—Steven Nguyen
*Assistant Examiner*—Clemence Han
(74) *Attorney, Agent, or Firm*—Brenda O. Holmes; Kilpatrick Stockton LLP

(57) ABSTRACT

A path network and a path network operation method capable of dealing with an abrupt traffic variation by realizing fast path bandwidth increase are disclosed. A path network is operated by transmitting path signals from a transmitting node to a receiving node through the working paths and the protection paths, and converting a protection path into a working path temporarily in order to increase a bandwidth of the working paths when a bandwidth increase request occurs in the path network. The transmitting node and the receiving node can convert a protection path into a working path by using the automatic path conversion information contained in the path overhead attached to the path signals.

18 Claims, 16 Drawing Sheets

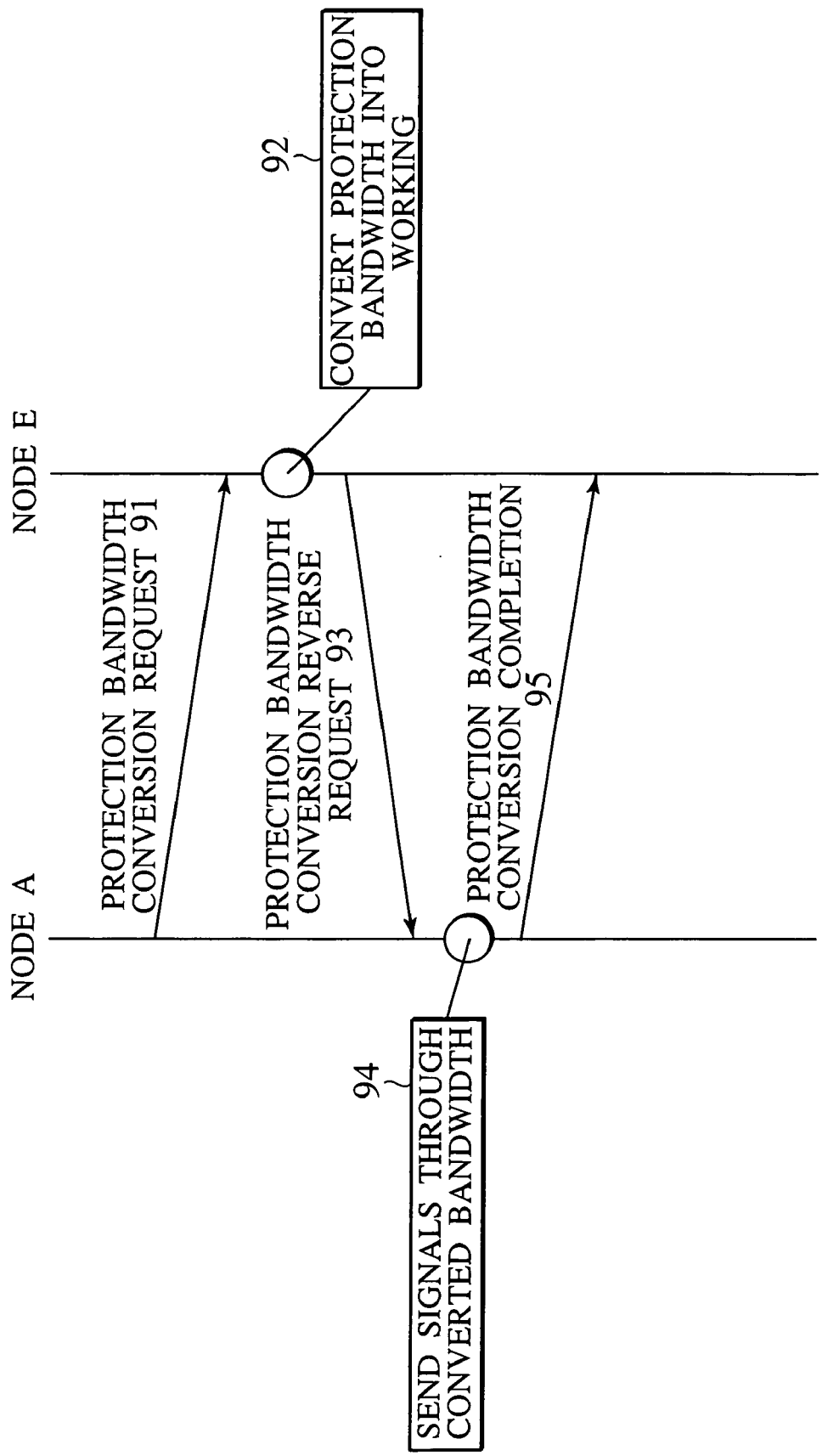

FIG.10

| BIT 1~4 | MEANING |
|---|---|
| 0000 | ORDINARY STATE |
| 0001 | PROTECTION PATH CONVERSION REQUEST |
| 0011 | PROTECTION PATH CONVERSION REVERSE REQUEST |
| 0100 | PROTECTION PATH CONVERSION COMPLETE & WAITING FOR CHANGE |
| 0101 | PROTECTION PATH CONVERSION COMPLETE & WAITING FOR CHANGE (REPLY) |
| 0110 | CHANGING PRIORITY ORDER BYTE |
| 0111 | CHANGING PRIORITY ORDER BYTE (REPLY) |
| OTHERS | UNDEFINED |

FIG.11

| BIT POSITION | MEANING |
|---|---|
| BIT 1 | 1 : WORKING PATH, 0 : PROTECTION PATH |
| BIT 2~8 | PRIORITY ORDERS FROM 0 TO 127 |

PATH NETWORK AND PATH NETWORK OPERATION METHOD USING CONVERSION OF PROTECTION PATH INTO WORKING PATH

BACKGROUND OF THE INVENTION

1. Field of the Invention

The present invention relates to a path network for carrying out communications using one or more working paths and one or more protection paths between nodes, and more particularly to a method for operating such a path network which is capable of dealing with a bandwidth increase request resulting from an abrupt traffic variation.

2. Description of the Background Art

Conventionally, in a path network where communications are carried out by using working paths and protection paths and these paths are managed by a network management system, when there is a bandwidth increase request due to an increase of traffic or a convenience of management, the bandwidth is increased by the network management system by searching for idle paths among the working paths as well as idle paths among the protection paths, and opening any idle paths that are found by the search to traffic.

Here, a path network is a network which employs a transmission network hierarchy (three hierarchical levels) in a frame structure as a characteristic of SDH (Synchronous Digital Hierarchy), which is defined along with a channel network and a media network, which is not dependent on any channels and transmission media, which is shared by various services in general, and which constitutes a unit of operation in a transmission path network. Also, an optical path is a unit of operation for each wavelength in a transmission path network.

In general, in the path network, the working path and the protection path are used to transmit the same signals between the same nodes via different routes such that the protection signals transmitted by the protection path can be utilized whenever the working path fails.

FIG. 1 and FIG. 2 show exemplary configurations of a conventional path network which respectively indicate an initial state before the path number change and a state after the path number change. FIG. 3 is a flow chart for the operation of a network management system in a conventional path number changing procedure.

In FIG. 1 and FIG. 2, the path network comprises nodes 1–5 (node A to node E), a network management system (OpS) 6, working paths indicated by solid lines, protection paths indicated by dashed lines, and network management communication paths indicated by dotted chain lines. FIG. 1 shows an initial state of an ordinary operation state, where two working paths are connected from a node A 1 to a node E 5 through a node B 2 and a node C 3. In such an initial state, a bandwidth increase request will be generated when traffic between the node A 1 and the node E 5 is increased or when it becomes necessary for a convenience of management as in the case of carrying out a construction between the node A 1 and the node E 5. The network management system 6 refers to a network configuration information to search for idle paths among the working paths as well as idle paths among the protection paths in response to the request, and if idle paths are found, the network management system 6 sends a command for opening a path to nodes (nodes A 1, B 2, C 3 and E 5 in this example) through which the idle path is passing. This path opening command is transmitted via the network management communication path indicated by the dotted chain line.

Upon receiving this path opening command, these nodes (nodes A 1, B 2, C 3 and E 5) open the path to traffic as commanded, so as to realize the bandwidth increase.

The path number changing procedure at the network management system 6 is as shown in FIG. 3. Namely, when there is a new path allocation request (step 71), the network management system 6 carries out a route calculation for calculating traffic between nodes 1 and 2, traffic between nodes 2 and 3, and traffic between nodes 3 and 5, as well as a resource reservation for maintaining and confirming the currently used working paths while searching for idle paths (step 72), and if an idle path is found, the path set up is executed by transmitting the path opening command (path set up command) to nodes through which the idle path is passing (steps 73–75).

As indicated by three solid lines in FIG. 2, after the bandwidth increase, the number of working paths is increased by one, and a third protection path 3 is opened by transmitting the path opening command from the network management system 6 to a protection node 4 as indicated by three dashed lines in FIG. 2.

However, in the case of allocating a new path via the network management system, the search of idle resources in the network requires a considerable amount of time so that it is extremely difficult to set up a new path in response to an abrupt traffic variation.

SUMMARY OF THE INVENTION

It is therefore an object of the present invention to provide a path network and a path network operation method capable of dealing with an abrupt traffic variation by realizing fast path bandwidth increase.

According to one aspect of the present invention there is provided a method for operating a path network for carrying out communications between nodes using one or more working paths and one or more protection paths, the method comprising the steps of: transmitting path signals from a transmitting node to a receiving node through the working paths and the protection paths; and converting a protection path into a working path temporarily in order to increase a bandwidth of the working paths when a bandwidth increase request occurs in the path network.

According to another aspect of the present invention there is provided a path network for carrying out communications between nodes, comprising: a transmitting node for transmitting path signals; a receiving node for receiving the path signals; and one or more working paths and one or more protection paths for transmitting path signals between the transmitting node and the receiving node; wherein the transmitting node and the receiving node have a function for converting a protection path into a working path temporarily in order to increase a bandwidth of the working paths when a bandwidth increase request occurs in the path network.

According to another aspect of the present invention there is provided a node device functioning as a transmitting node in a path network for carrying out communications between nodes using one or more working paths and one or more protection paths, the node device comprising: a plurality of path generation units, each path generation unit transmits path signals obtained by attaching a path overhead to client signals, where the path overhead contains an automatic path conversion information to be used in converting a protection path into a working path, such that a protection path is converted into a working path temporarily by using the automatic path conversion information contained in the path overhead, in order to increase a bandwidth of the working paths when a bandwidth increase request occurs in the path network; a plurality of multiplexing units, each multiplexing unit multiplexes the path signals to be transmitted through each route and transmits multiplexed path signals through each route; and a switch unit for switching the path signals transmitted by the path generation units into the multiplexing units.

According to another aspect of the present invention there is provided a node device functioning as a receiving node in a path network for carrying out communications between nodes using one or more working paths and one or more protection paths, the node device comprising: a plurality of path termination units, each path termination unit applies a termination processing to a path overhead attached to path signals received from a transmitting node, where the path overhead contains an automatic path conversion information to be used in converting a protection path into a working path, such that a protection path is converted into a working path temporarily by using the automatic path conversion information contained in the path overhead, in order to increase a bandwidth of the working paths when a bandwidth increase request occurs in the path network; a plurality of demultiplexing units, each demultiplexing unit demultiplexes multiplexed path signals transmitted through each route into path signals for each path; and a switch unit for switching the path signals for each path obtained by the demultiplexing units into the path termination units.

Other features and advantages of the present invention will become apparent from the following description taken in conjunction with the accompanying drawings.

BRIEF DESCRIPTION OF THE DRAWINGS

FIG. 9 is a signal sequence chart for an automatic path conversion procedure in a path network according to the present invention.

FIG. 10 is a table showing an exemplary definition of an automatic path conversion byte used in a path network according to the present invention.

FIG. 11 is a table showing an exemplary definition of a priority order byte used in a path network according to the present invention.

DETAILED DESCRIPTION OF THE PREFERRED EMBODIMENTS

Referring now to FIG. 4 to FIG. 17, one embodiment of a path network and a path network operation method according to the present invention will be described in detail.

In short, the path network and the path network operation method of the present invention deal with the bandwidth increase request due to an abrupt traffic variation by temporarily utilizing a protection path as a working path and searching and reserving unused network resources at the network management system while temporarily utilizing the protection path in response to the bandwidth increase request, in view of the fact that the path network provides protection paths in correspondence to working paths in most cases.

Figure 1:
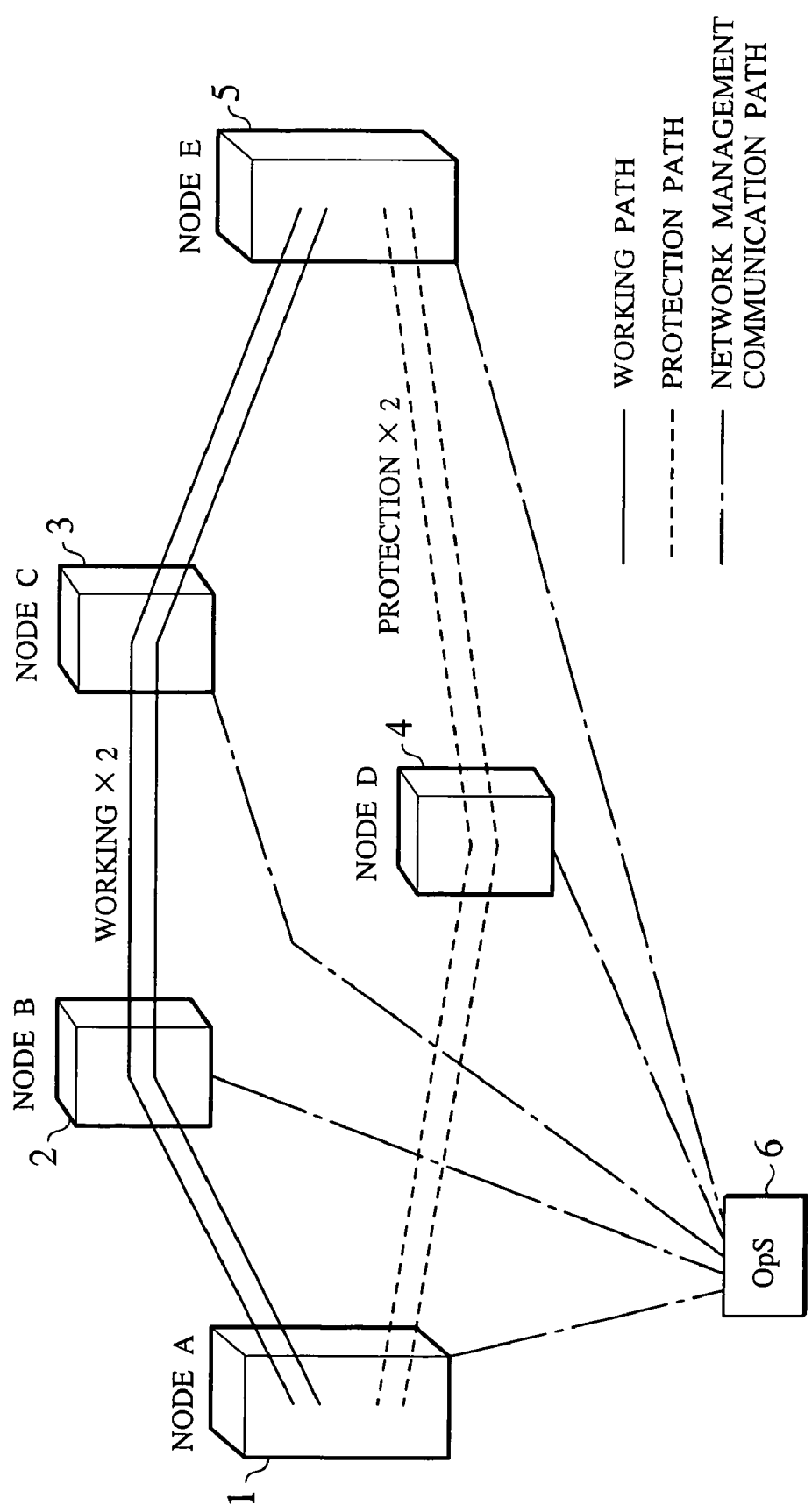
FIG. 1 is a diagram showing a configuration of a conventional path network in an initial state before the path number change.
Figure 2:
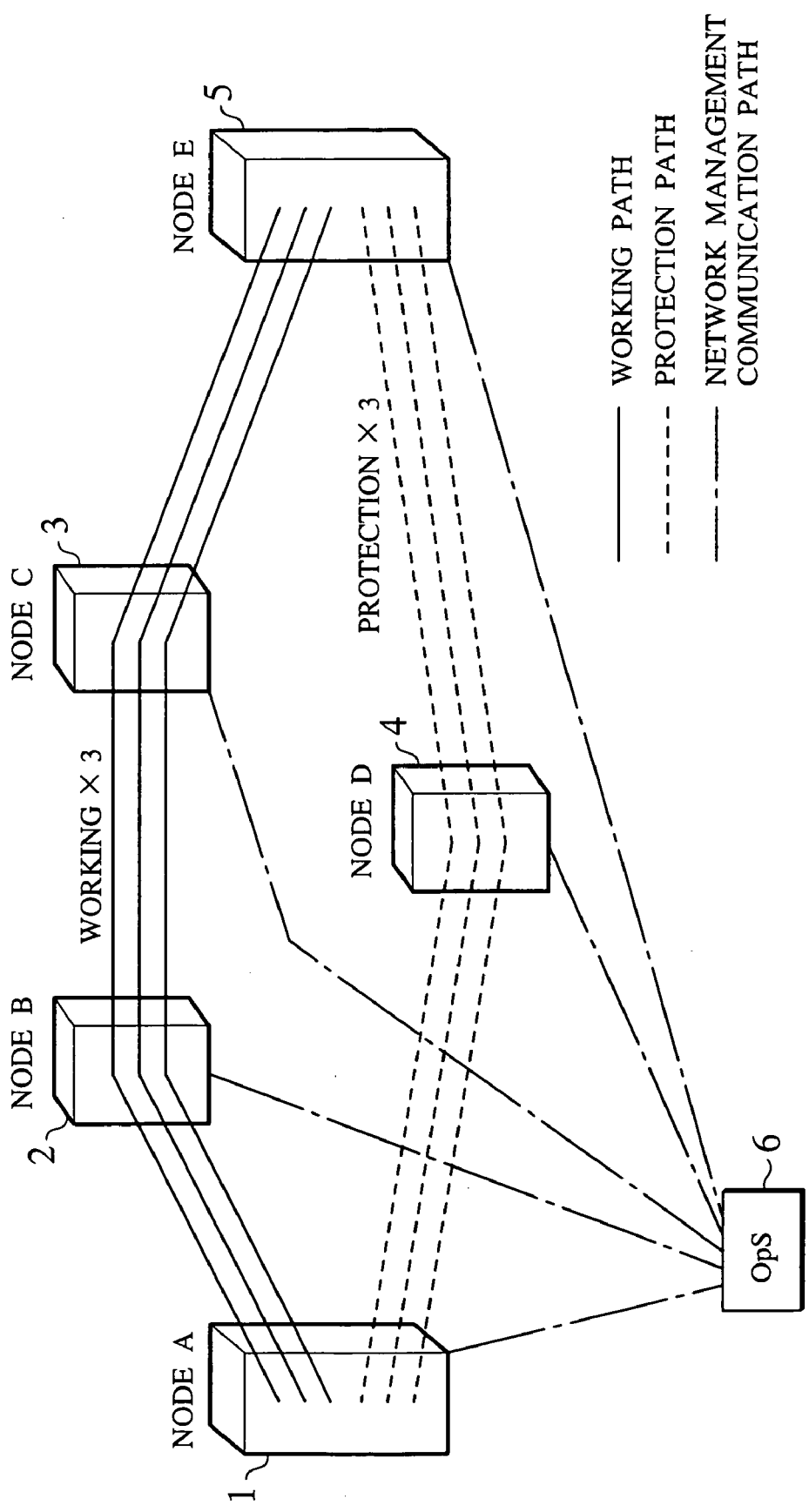
FIG. 2 is a diagram showing a configuration of a conventional path network in a state after the path number change.
Figure 3:
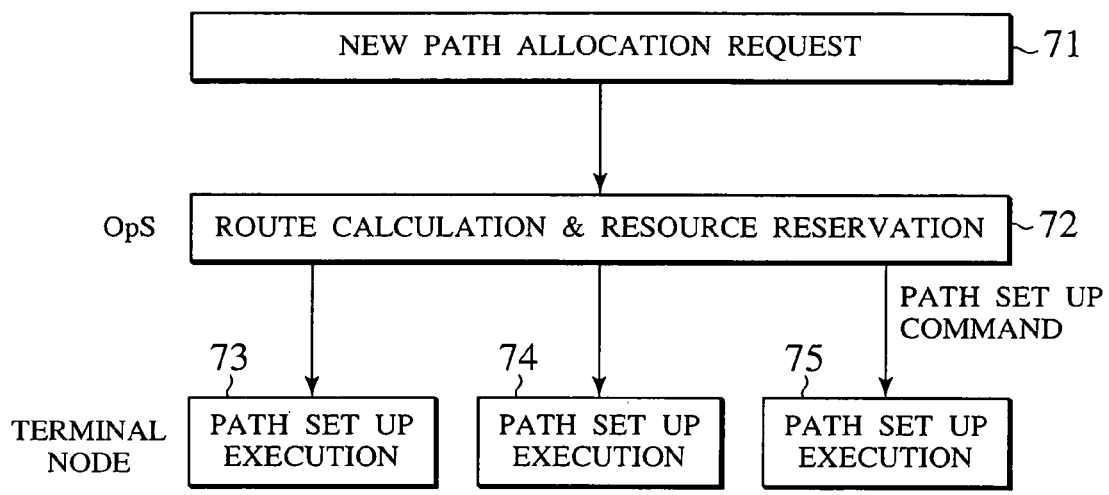
FIG. 3 is a flow chart for a conventional path number changing procedure used in a conventional path network.
Figure 4:
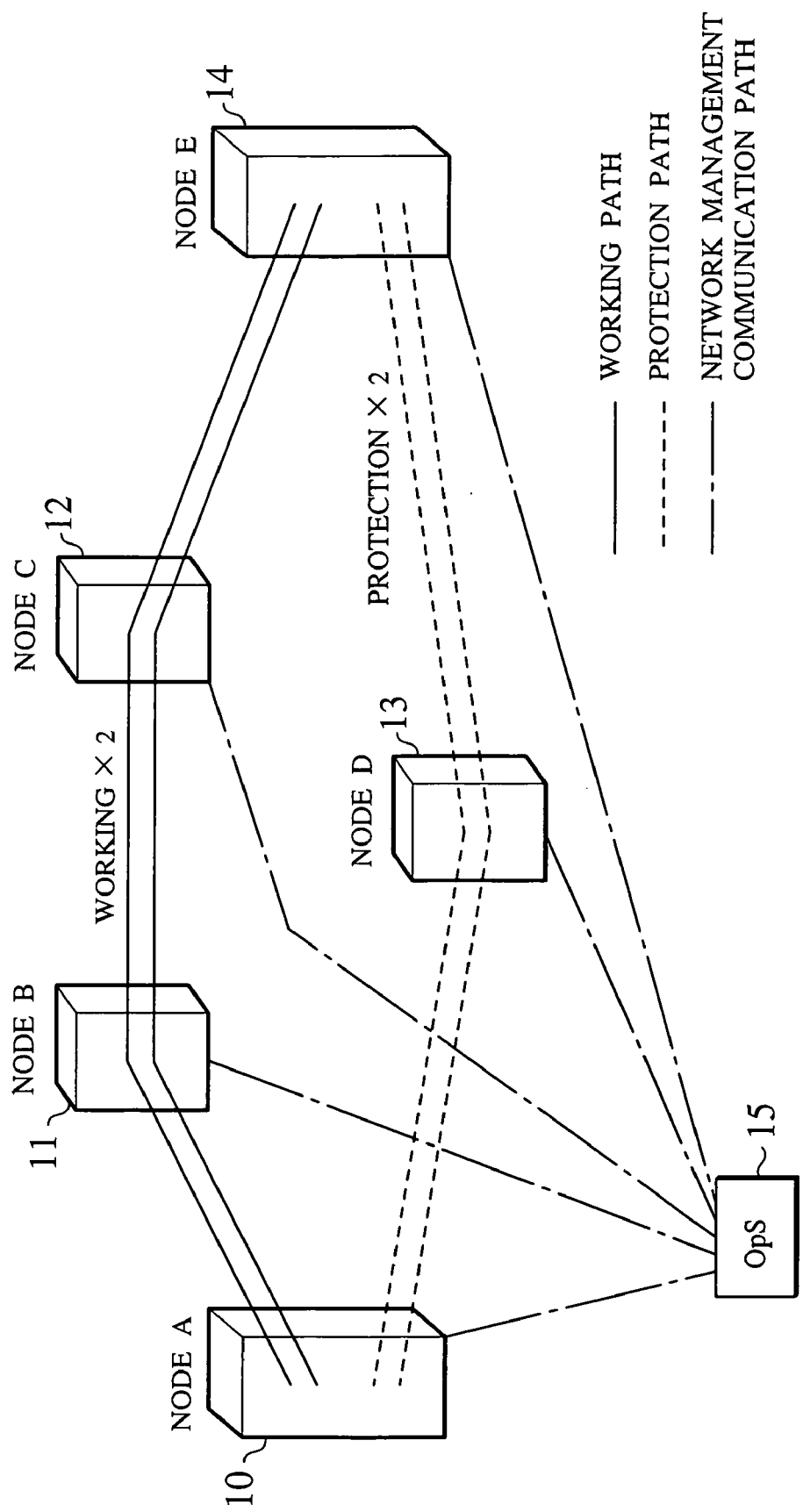
FIG. 4 is a diagram showing a configuration of a path network according to the present invention, in an initial state.
Figure 5:
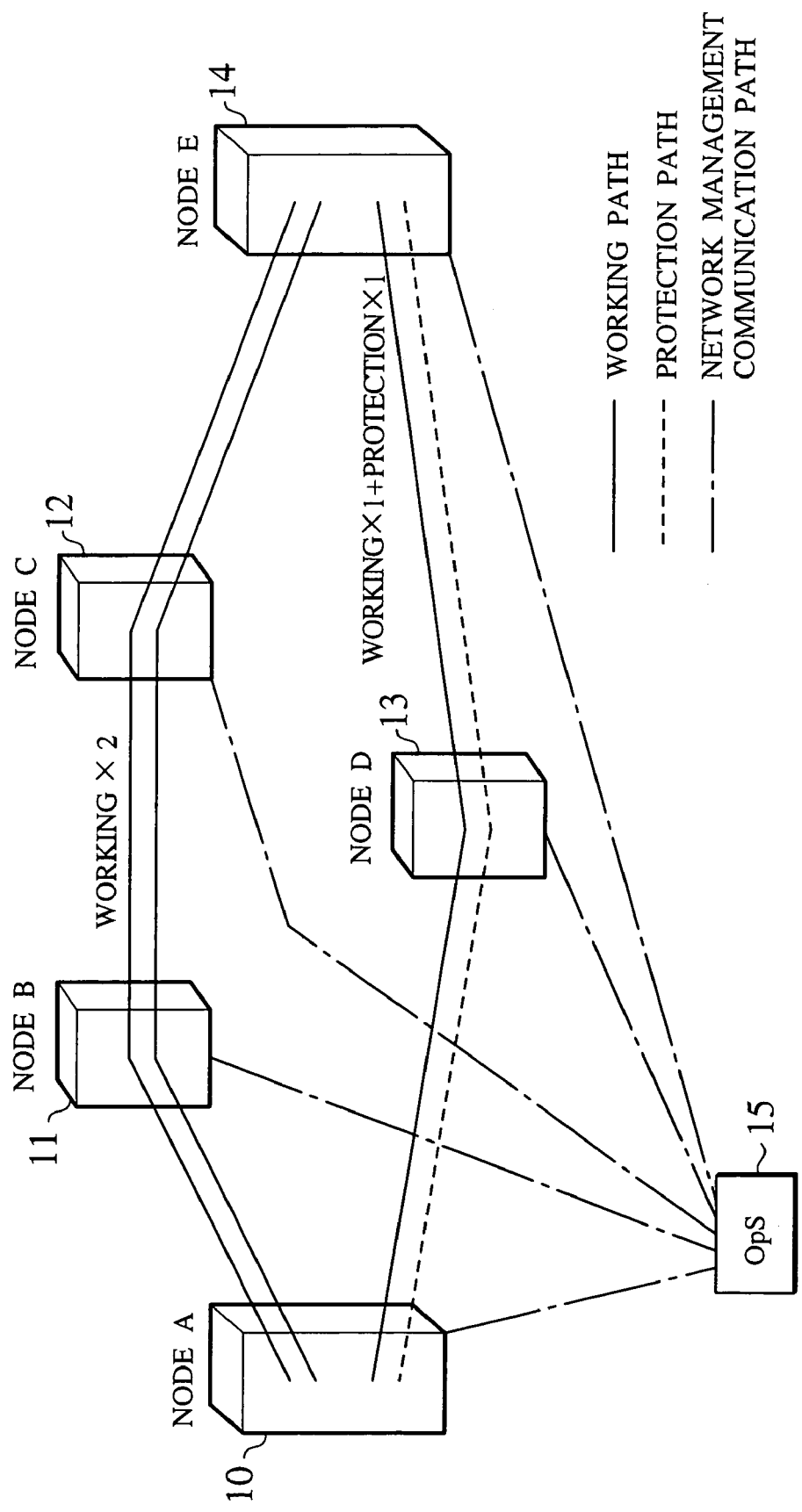
FIG. 5 is a diagram showing a configuration of a path network according to the present invention, in a state after an automatic path conversion.
Figure 6:
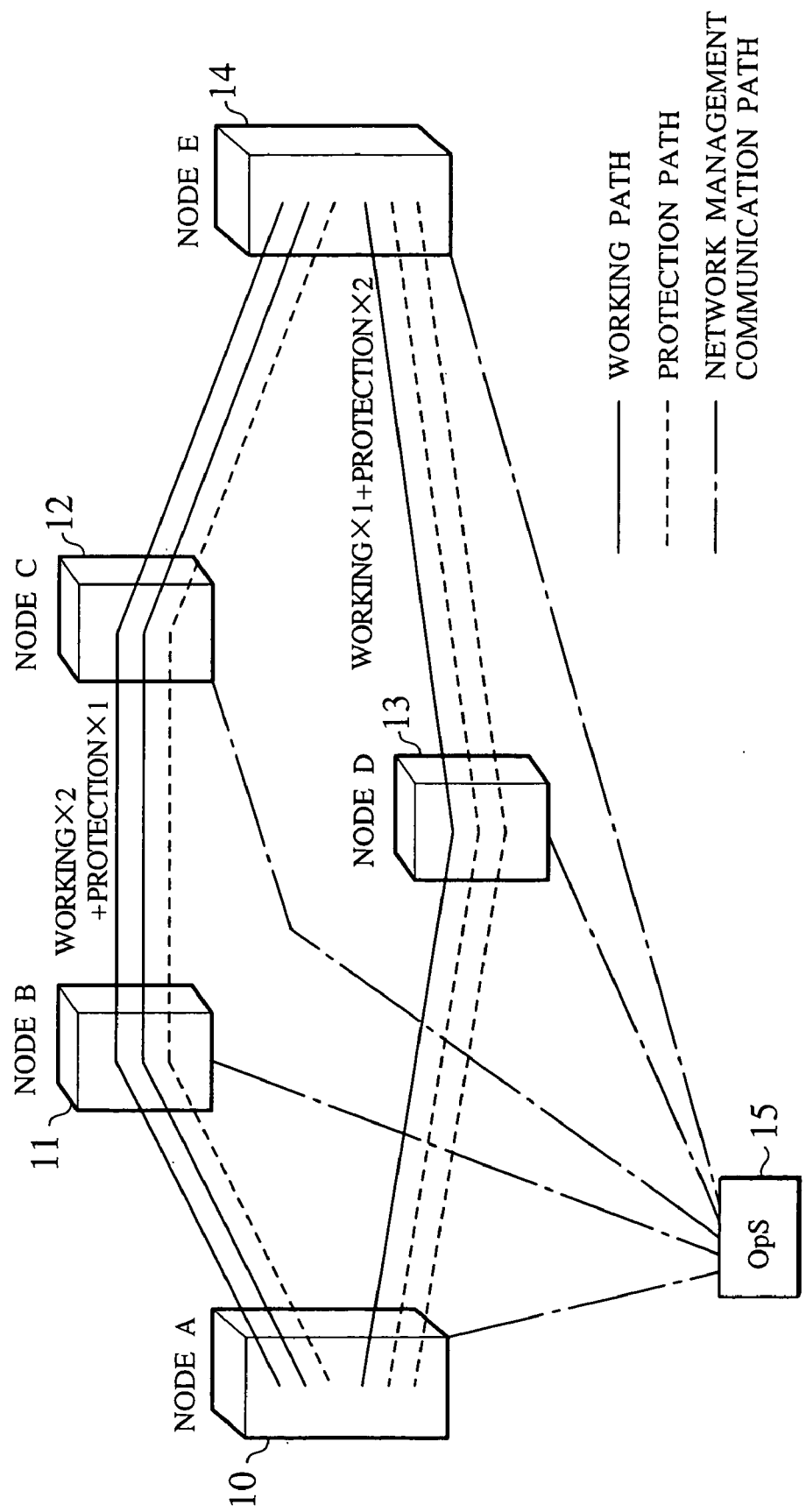
FIG. 6 is a diagram showing a configuration of a path network according to the present invention, in a state where protection paths are added.
Figure 7:
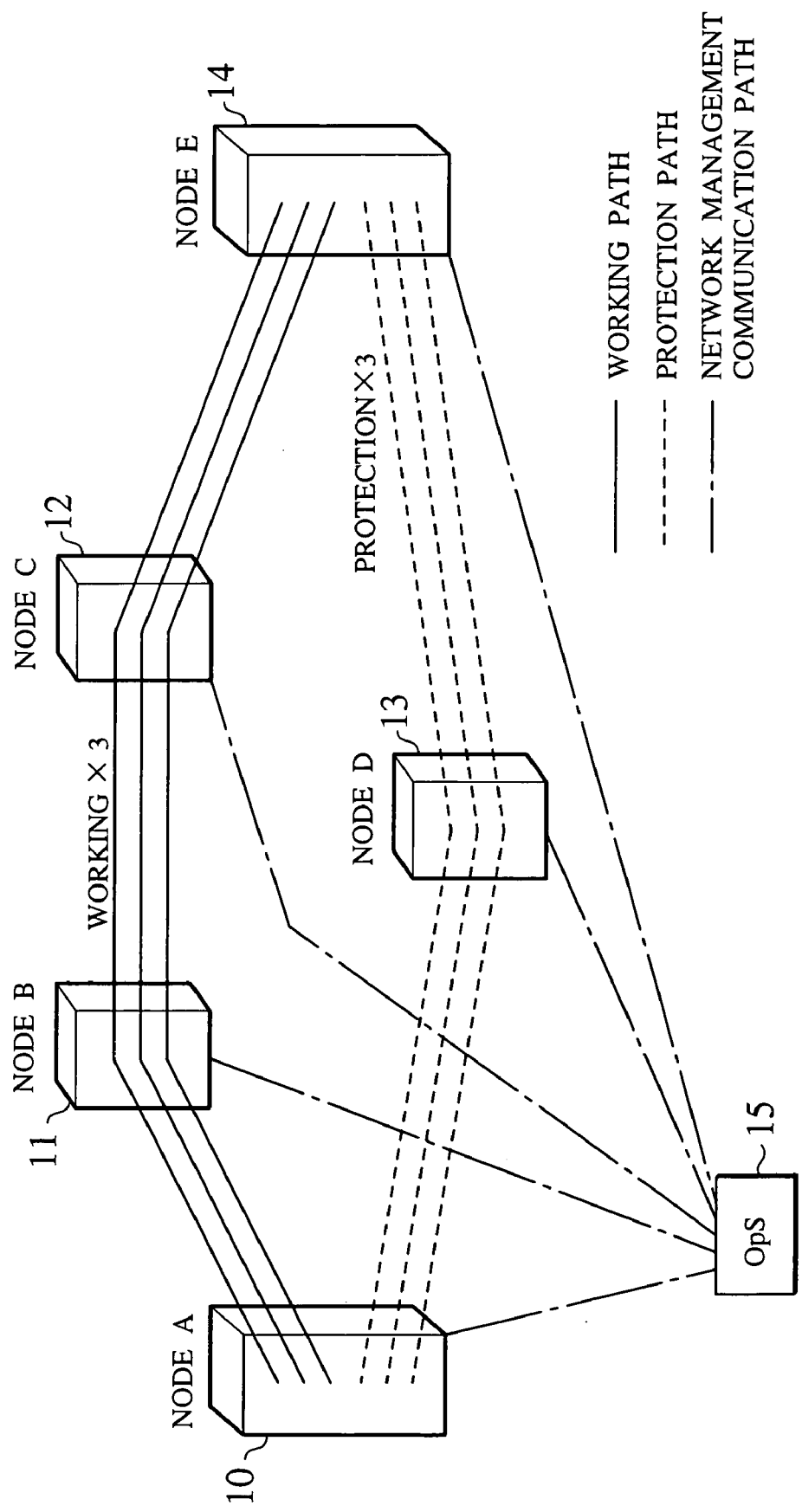
FIG. 7 is a diagram showing a configuration of a path network according to the present invention, in a state after a priority order byte re-assignment.

FIG. 4 to FIG. 7 show various states of the path network as operated by the path network operation method of this embodiment, where FIG. 4 shows an initial state, FIG. 5 shows a state after an automatic path number change, FIG. 6 shows a state in which a protection path is added by the network management system, and FIG. 7 shows a state after a priority order byte re-assignment.

In FIG. 4 to FIG. 7, the path network comprises nodes 10–14 (node A to node E), a network management system (OpS) 15, working paths indicated by solid lines, protection paths indicated by dashed lines, and network management communication paths indicated by dotted chain lines.

In the initial state of FIG. 4, two working paths are set up from the node A 10 to the node E 14 through the node B 11 and the node C 12, while two protection paths are set up from the node A 10 to the node E 14 through the node D 13. The network management system 15 is connected with all the nodes through the network management communication paths. In this state, the protection signals flowing through two protection paths are equivalent to the working signals flowing through two working paths.

Suppose now that there is a new path allocation request in the state of FIG. 4. Such a new path allocation request is issued by a traffic monitoring function of a router or an operator external to the path network of FIG. 4, and detected by a control unit (not shown) provided in the node. Then, a processing for converting the protection path into the working path automatically is carried out between the node A 10 and the node E 14 such that one of the two paths that are used as the protection paths is converted into a working path. FIG. 5 shows a state at this point, where one working path and one protection path are set up from the node A 10 to the node E 14 through the node D 13, in addition to the two working paths from the node A 10 to the node E 14 through the node B 11 and the node C 12. In such a state, only the protection signals corresponding to the working signals flowing through the working path with the highest priority level will flow through the protection path. For instance, the protection signals flowing through the protection path from the node A 10 to the node E 14 through the node D 13 can correspond to the working signals flowing through the upper working path from the node A 10 to the node E 14 through the node B 11 and the node C 12.

Suppose now that two new protection paths are allocated thereafter by the network management system 15 in the state of FIG. 5. FIG. 6 shows a state at this point, where one newly allocated protection path is set up from the node A 10 to the node E 14 through the node B 11 and the node C 12 in addition to the two working paths, while one newly allocated protection path is set up from the node A 10 to the node E 14 through the node D 13 in addition to the one working path and the one protection path. In this state, the protection signals flowing through three protection paths are equivalent to the working signals flowing through three working paths again.

Finally, the network management system 15 re-arranges the working paths and the protection paths by interchanging the one working path and the one protection path, such that three working paths are set up from the node A 10 to the node E 14 through the node B 11 and the node C 12 while three protection paths are set up from the node A 10 to the node E 14 through the node D 13. FIG. 7 shows a state after this re-arrangement. This re-arrangement can be realized by the priority order byte re-arrangement as will be described below.

Figure 8:
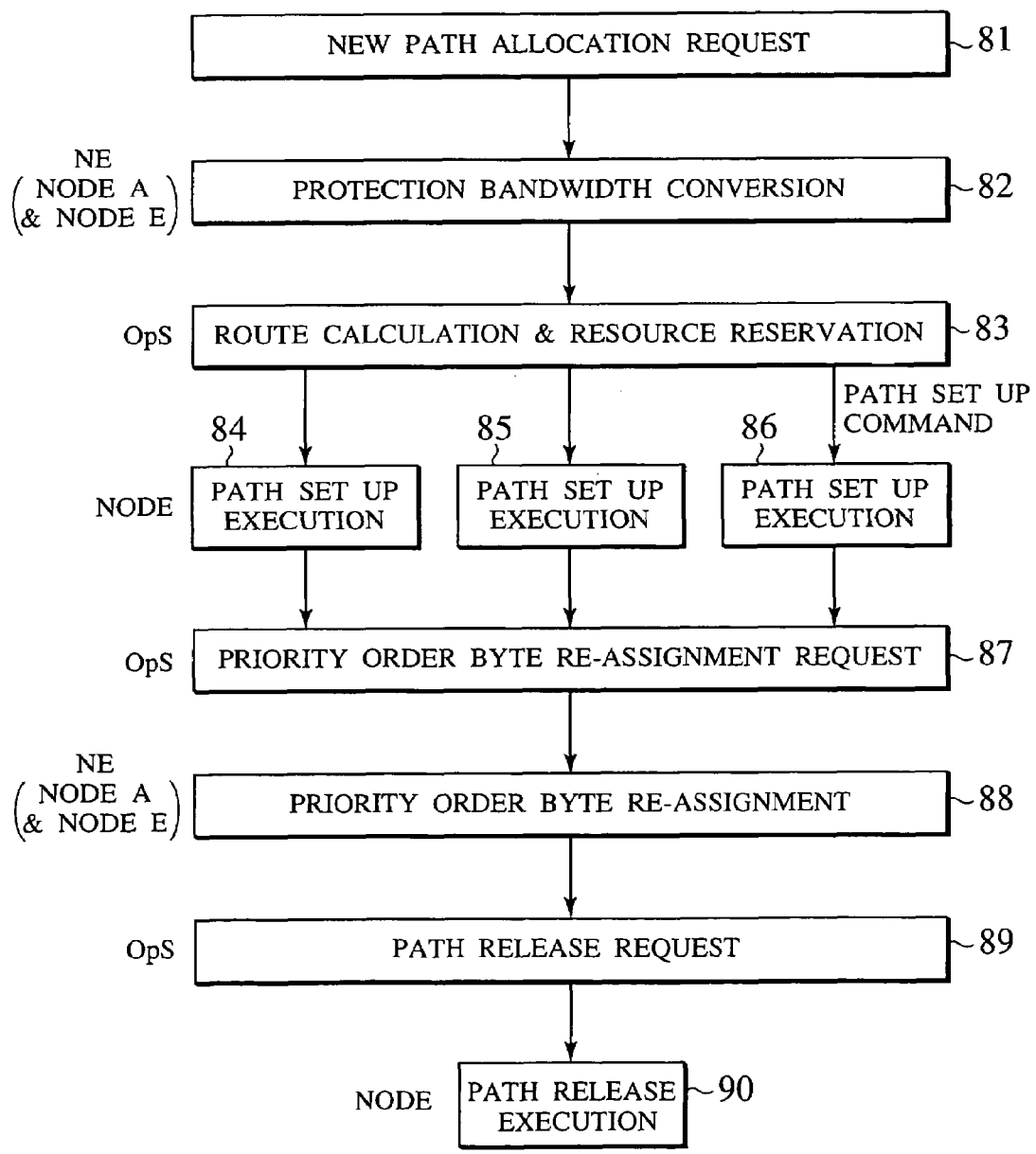
FIG. 8 is a flow chart for an automatic path conversion procedure in a path network according to the present invention.

FIG. 8 shows a flow chart for the operation of the path conversion method used in this embodiment.

When a new path allocation request is generated due to some cause such as a traffic increase (step 81), a protection bandwidth is converted into a working bandwidth automatically between the node A 10 and the node E 14 (step 82). Then, the network management system 15 carries out the route calculation and the reservation of idle resources in the network (step 83), allocates a new path and sends the path set up command so as to set up the path at each relevant node (steps 84–86). Then, the working paths and the protection paths are re-arranged by re-assigning the priority order bytes of the paths according to a request of the network management system 15 (steps 87, 88). After a required bandwidth in the path network decreases, the network management system 15 can request a release of some working paths and protection paths by sending the path release command so as to reduce a bandwidth of the working paths and the protection paths (steps 89, 90).

Note that the re-arrangement of the working paths and the protection paths as shown in FIG. 7 and the priority order byte re-assignment of the step 88 is an optional feature that can be omitted if desired. Also, the path releasing of the step 90 is an optional feature that can be omitted if desired.

The correspondence between the steps of FIG. 8 and FIG. 4 to FIG. 7 described above is as follows. A state (initial state) before the new path allocation request (step 81) corresponds to FIG. 4, a state after the protection bandwidth conversion (step 82) corresponds to FIG. 5, a state after the resource reservation and the path set up execution (steps 83–86) corresponds to FIG. 6, and a state after the priority order byte re-assignment (step 88) corresponds to FIG. 7.

FIG. 9 shows a signal sequence chart for the automatic bandwidth conversion, FIG. 10 shows an exemplary definition of an automatic bandwidth conversion byte (automatic path conversion byte), and FIG. 11 shows an exemplary definition of a priority order byte.

In FIG. 10, the automatic bandwidth conversion byte is defined by four bits (bit 1 to bit 4) as follows. "0000" indicates an ordinary state, "0001" indicates a protection path conversion request for requesting conversion of a protection path into a working path, "0011" indicates a protection path conversion reverse request for requesting signal transmission through the converted bandwidth with respect to a node that issued the request, "0100" indicates a protection path conversion complete and waiting for change, "0101" indicates a reply for the same content as "0100", "0110" indicates changing priority order byte, and "0111" indicates a reply for the same content as "0110".

Also, FIG. 11 defines the first bit for distinguishing between the working path and the protection path, and the second to eighth bits for indicating the priority orders from "0" to "127".

In the above described path conversion method, the priority order byte is utilized as follows. Namely, the priority orders are assigned to the working paths and the protection paths in advance, such that the protection path with the priority order No. 1 will be converted into a working path at a time of converting a protection path into a working path. For example, in FIG. 4, the priority orders No. 1 and No. 2 are assigned to the upper one and the lower one of the two working paths respectively while the priority orders No. 1 and No. 2 are also assigned to the upper one and the lower one of the two protection paths respectively. Then at a time of converting a protection path into a working path, the protection path with the priority order No. 1 will be converted into a working path as shown in FIG. 5. Also, at a time of reducing the number of paths as the required bandwidth decreases, paths with the lower priority levels are discarded at higher priority. Also, at a time of re-arranging the paths by re-assigning the priority order byte, the first bit of the priority order byte of the paths that are to be interchanged will be changed.

The operation sequence for the automatic bandwidth conversion is carried out according to FIG. 9 as follows.

In the case of converting a protection path into a working path automatically between nodes, the conversion is realized by defining the automatic path conversion byte and the priority order byte in an overhead section of the path and exchanging this information.

First, the node A transmits the protection path conversion request 91 using a downward communication path. The node E that received the protection path conversion request 91 converts the protection bandwidth into the working bandwidth (92), reserves an output terminal at the receiving side, connects its input to the path from which the protection path conversion request 91 is received, and returns the protection path conversion reverse request 93. The node A that received the protection path conversion reverse request 93 transmits signals through the converted path (94) and notifies the protection path conversion completion 95 to the node E.

In this way, the automatic path conversion information to be used in converting a protection path into a working path and the priority order information indicating the priority order of the path are exchanged by being contained in the path overhead.

FIG. 12 to FIG. 15 show exemplary node configurations of the node A and the node E in order to explain the path set up.

Figure 12:
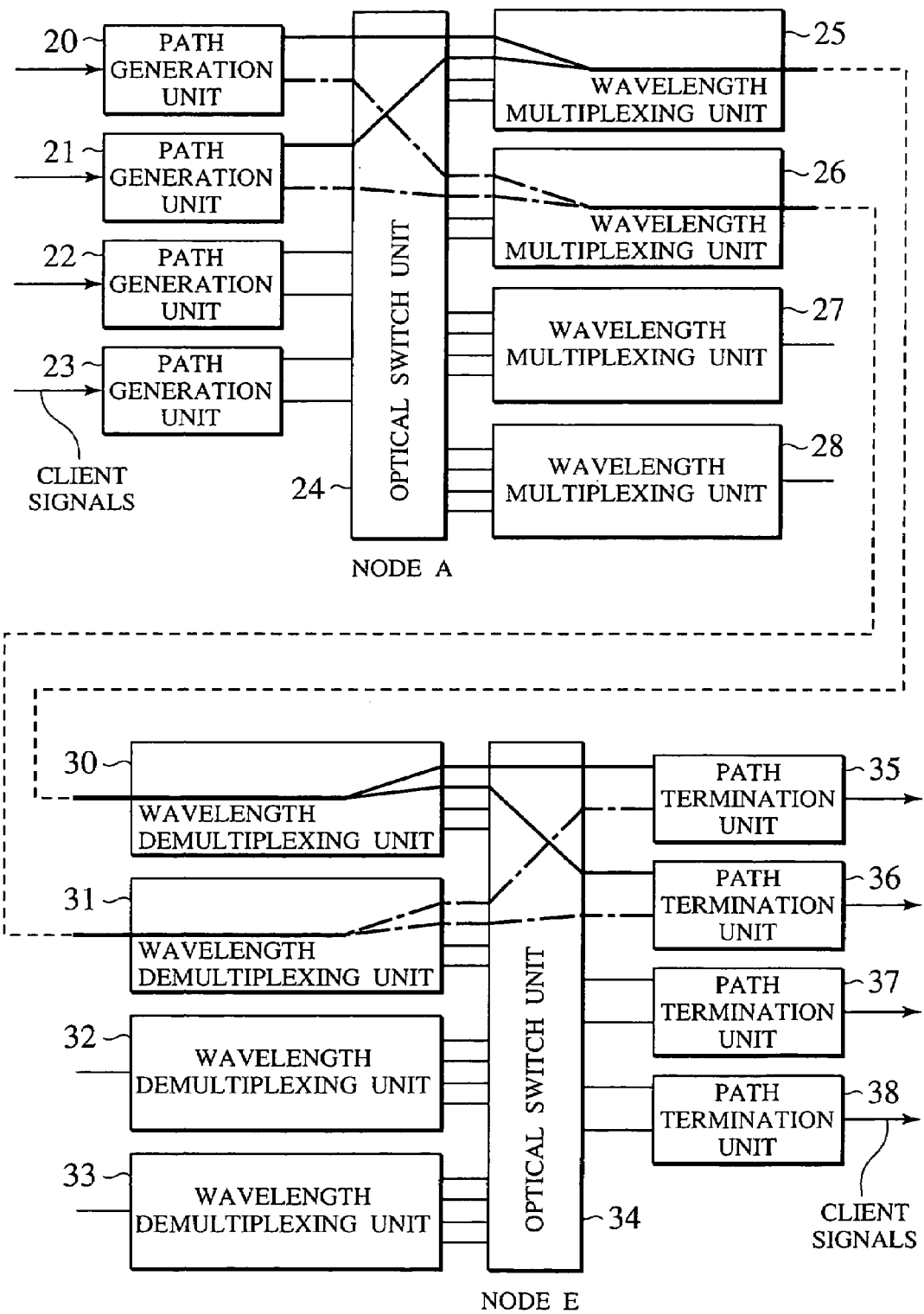
FIG. 12 is a block diagram showing an exemplary node configuration for a path network according to the present invention in a state shown in FIG. 4.
Figure 13:
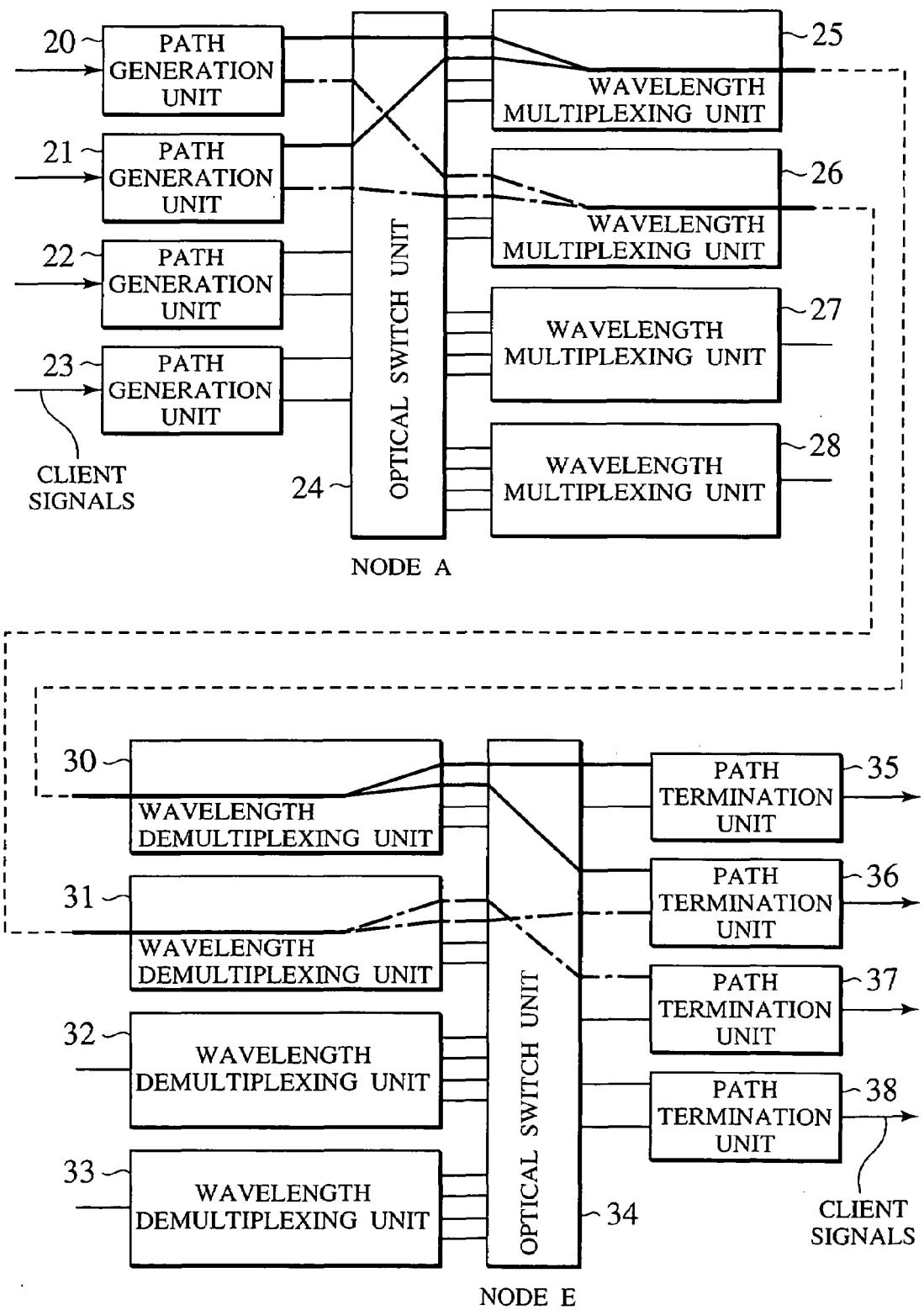
FIG. 13 is a block diagram showing an exemplary node configuration for a path network according to the present invention in a state of transition from that shown in FIG. 4 to that shown in FIG. 5.
Figure 14:
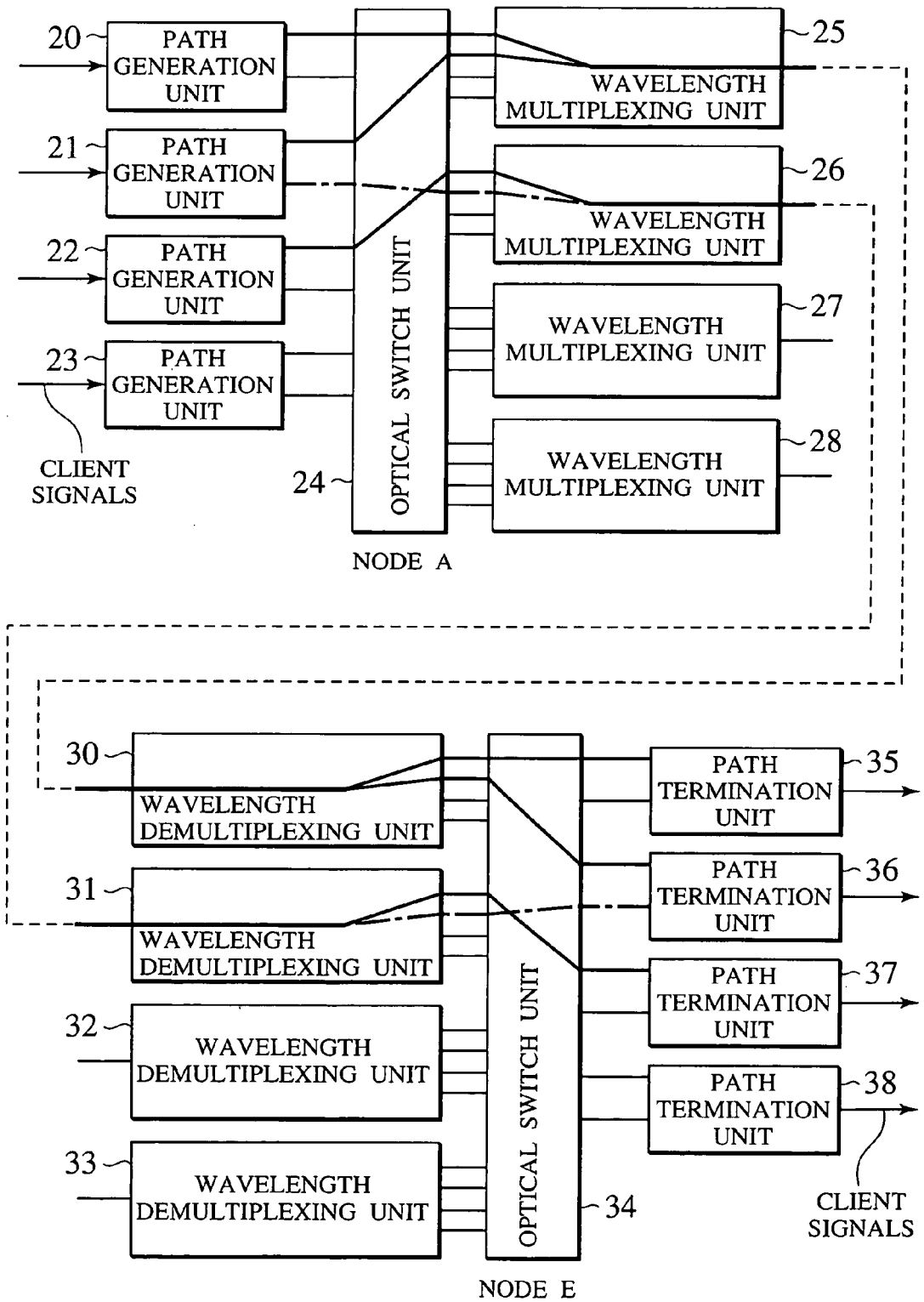
FIG. 14 is a block diagram showing an exemplary node configuration for a path network according to the present invention in a state shown in FIG. 5.
Figure 15:
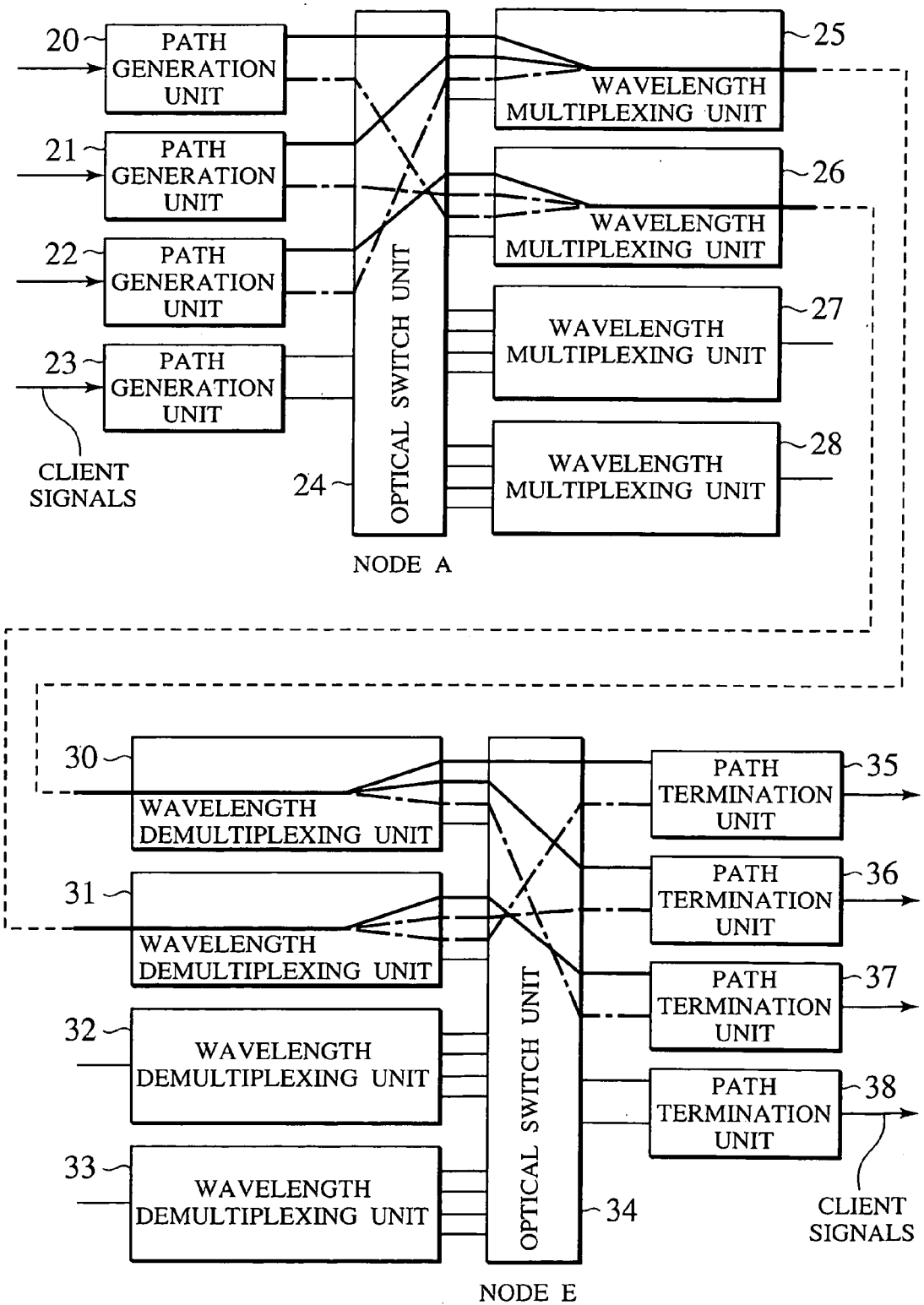
FIG. 15 is a block diagram showing an exemplary node configuration for a path network according to the present invention in a state shown in FIG. 6.

FIG. 12 shows a node configuration in the case of using two working paths and two protection paths as shown in FIG. 4, FIG. 13 shows a node configuration in a process of transition from a state of FIG. 4 to a state of FIG. 5, FIG. 14 shows a node configuration in the case of using three working paths and one protection path as shown in FIG. 5, and FIG. 15 shows a node configuration after setting up three working paths and three protection paths as shown in FIG. 6.

In FIG. 12 to FIG. 15, the node A comprises path generation units 20–23, an optical switch unit 24, and wavelength multiplexing units 25–28, while the node E comprises wavelength demultiplexing units 30–33, an optical switch unit 34, and path termination units 35–38. Note that, although not shown in FIG. 12 to FIG. 15, each node has a control unit for controlling the operation of the above noted units constituting each node, as will be described below. Note also that the exemplary case of transmitting signals from the node A to the node E will be described here, and the description of the case of transmitting signals in the opposite direction will be omitted.

The exchange of the path overhead is carried out between the path generation units 20–23 and the path termination units 35–38. Here, an overhead is an ample region for transferring the operation maintenance information that is provided in a transmission frame in order to enable sophisticated network operation. In the SDH, the overhead region amounting to approximately 10% of the transmission frame is defined. As described above, the path overhead used in the present invention contains the automatic path conversion information to be used in converting a protection path into a working path and the priority order information for indicating the priority order of the path.

The node A on the transmitting side in FIG. 12 comprises the path generation units 20–23, the optical switch unit 24 and the wavelength multiplexing units 25–28. When the client signals are entered into the path generation units 20–23, the path generation units 20–23 generate path signals by attaching the path overhead to the client signals. The path overhead contains the automatic path conversion information and the priority order information mentioned above. The optical switch unit 24 sets appropriate routes for signals of the working paths and the protection paths from the path generation units 20–23.

For example, the working paths from the path generation units are sent to the wavelength multiplexing unit 25 via the optical switch unit 24, and a plurality of working paths are multiplexed at the wavelength multiplexing unit 25 and transmitted to the transmission path. Also, the protection paths from the path generation units are sent to the wavelength multiplexing unit 26 via the optical switch unit 24, and a plurality of protection paths are multiplexed at the wavelength multiplexing unit 26 and transmitted to the transmission path.

At the receiving side, two paths from different transmission paths including the working path and the protection path are lead to a prescribed one of the path termination units 35–38 in most cases. Then, the client signals are outputted from the path termination units 35–38. In FIG. 12 to FIG. 15, the working paths are indicated by bold solid lines while the protection paths are indicated by bold dotted chain lines.

FIG. 12 shows an initial state in which two working paths and two protection paths are set up between the node A and the node E. The two working paths are transmitted and received through the transmission path connecting the wavelength multiplexing unit 25 on the transmitting side and the wavelength demultiplexing unit 30 on the receiving side, while the two protection paths are transmitted and received through the transmission path connecting the wavelength multiplexing unit 26 on the transmitting side and the wavelength demultiplexing unit 31 on the receiving side.

FIG. 13 shows a state after the protection path connected to the path termination unit 35 is re-connected to the path termination unit 37 in the receiving side node E as the bandwidth change request is issued. Namely, when the control unit (not shown) of the node A detects the bandwidth change request, the node A is controlled by its control unit to transmit the protection path conversion request through the downward transmission path. In response, the node E is controlled by its control unit to reserve an output terminal at the receiving side, that is the path termination unit 37, and connect its input to the wavelength demultiplexing unit 31 through the optical switch 34 so as to connect it to the path to the node A from which the conversion request is received. Then, the protection path conversion reverse request is transmitted to the node A through this path.

In FIG. 14, after the reverse request is sent from the node E to the node A, the transmitting side node A is controlled by its control unit such that the protection path of the path generation unit 20 is converted as a working path of the path generation unit 22. Then, after receiving the reverse request, the node A is controlled by its control unit to transmit signals to the converted path via the path generation unit 22, the optical switch unit 24 and the wavelength multiplexing unit 26, and notify the protection path conversion complete to the node E. In this way, in FIG. 14, two working paths are connected through the transmission path connecting the wavelength multiplexing unit 25 on the transmitting side and the wavelength demultiplexing unit 30 on the receiving side, while one working path and one protection path are connected through the transmission path connecting the wavelength multiplexing unit 26 on the transmitting side and the wavelength demultiplexing unit 31 on the receiving side.

In FIG. 15, a new protection path set up is carried out by the network management system such that protection paths are set up between the path generation unit 20 on the transmitting side and the path termination unit 35 on the receiving side as well as between the path generation unit 22 on the transmitting side and the path termination unit 37 on the receiving side. Namely, a protection path that is newly set up at the path generation unit 20 on the transmitting side is connected to the wavelength demultiplexing unit 31 on the receiving side through the optical switch unit 24, the wavelength multiplexing unit 26 and the transmission path, and then connected to the path termination unit 35 through the optical switch unit 34. Also, a protection path that is newly set up at the path generation unit 22 on the transmitting side is connected the wavelength demultiplexing unit 30 on the receiving side through the optical switch unit 24, the wavelength multiplexing unit 25 and the transmission path, and then connected to the path termination unit 37 through the optical switch unit 34.

In this way, two working path and one protection path are set up in the transmission path connecting the wavelength multiplexing unit 25 on the transmitting side and the wavelength demultiplexing unit 30 on the receiving side, while one working path and two protection paths are set up in the transmission path connecting the wavelength multiplexing unit 26 on the transmitting side and the wavelength demultiplexing unit 31 on the receiving side.

In FIG. 12 to FIG. 15, the path generation units 20–23 are operated such that the priority order byte indicating the priority order and the distinction between the working path and the protection path, and the automatic path conversion byte indicating a request for converting a protection path into a working path, a reverse request, a conversion complete and waiting for change, or changing priority order byte, are defined in the path overhead at a time of generating the path signals by attaching the path overhead to the client signals.

Also, the path termination units 35–38 are operated such that the automatic path conversion byte and the priority order byte in the path overhead are recognized at a time of recovering the client signals by carrying out the termination processing with respect to the path overhead received from the transmitting node, and in the case where the received signals is the protection path conversion request, the output terminal at the receiving side is reserved and its input is connected to the path from which the protection path conversion request is received, and the protection path conversion reverse request is returned to the transmitting node.

Figure 16:
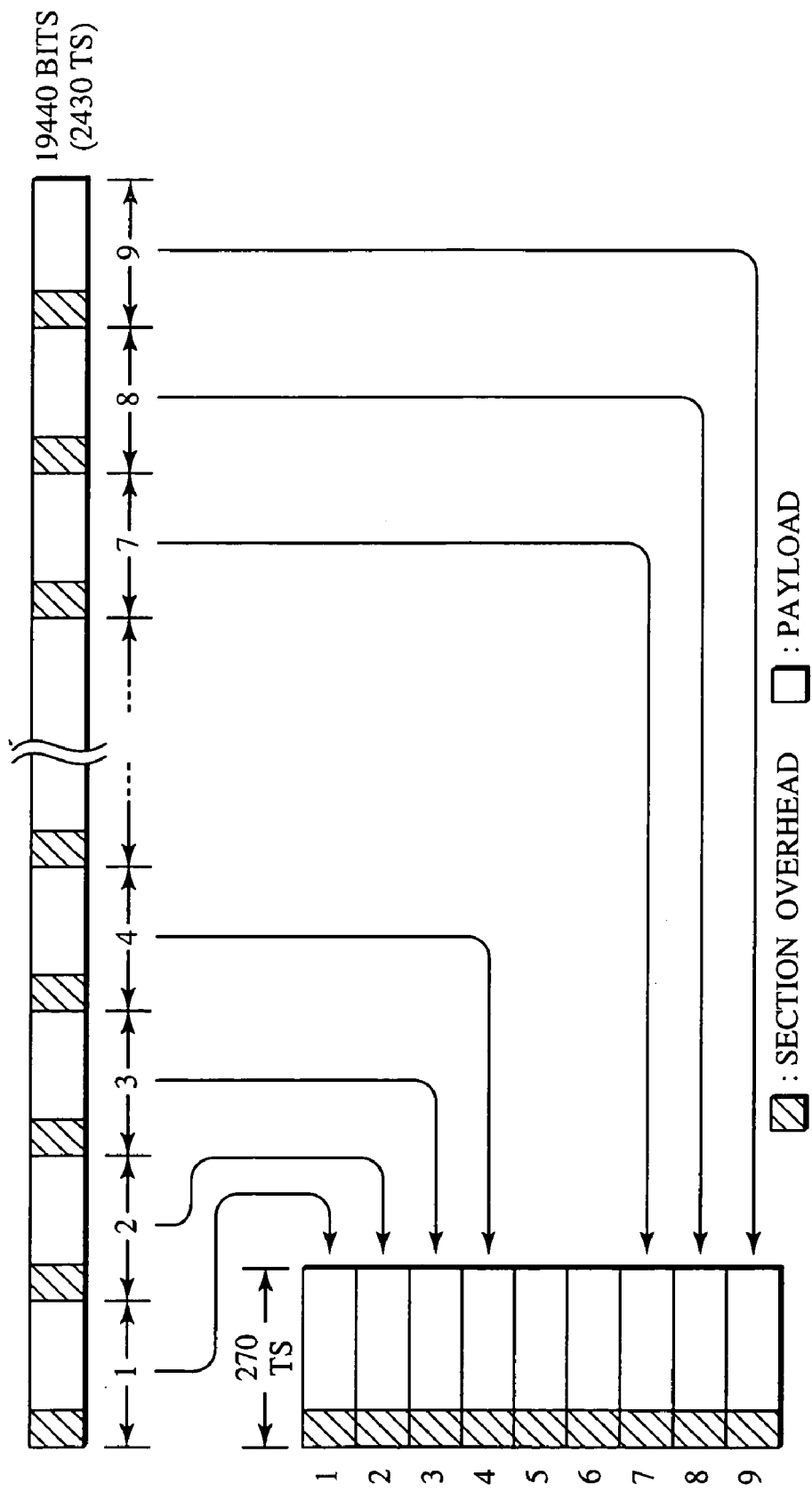
FIG. 16 is a diagram showing an exemplary frame configuration used in optical path generation units and optical path termination units in the node configuration shown in FIG. 12 to FIG. 15.

FIG. 16 shows an exemplary frame configuration for the optical path signals that can be used by the path generation units and the path termination units in the node configuration of FIG. 12 to FIG. 15.

The SDH (Synchronous Digital Hierarchy) is used as the wideband communication technique represented by the wideband ISDN (Integrated Services Digital Network), and the basic unit for multiplexing in the SDH is STM (Synchronous Transport Module). The basic unit (level 1) is STM-1 (155.52 Mbits/sec), but the others including STM-4 (622,08 Mbits/sec) and STM-16 (2.488 Gbits/sec) are also specified. FIG. 16 shows an exemplary case of using STM-1 frame.

The STM frame is formed by (section) overheads and payloads. Here, the (section) overhead is a region for transmitting signals to be used for managing the network, and in the present invention, the automatic path conversion information and the priority order information are defined there. Note that the payload is a region for transmitting user data.

The path network is a network which is not dependent on any channels and transmission media, which is shared by various services in general, and which constitutes a unit of operation in a transmission path network. In the SDH, a transmission system portion in the transmission media network layer is defined as a section, and a path in the path network layer is defined as a virtual container.

The wavelength multiplexing technique not only increases a capacity of the transmission path, but also enables the use of wavelengths for the path identification and the path routing that are conventionally realized by using a time position within a TDM (Time Division Multiplexing) frame or a cell header in the case of ATM (Asynchronous Transfer Mode) at a transmission node (cross-connect, ADM (Add/Drop Multiplexer)). An optical network system using optical paths in which the wavelength multiplexing in the transmission path is used and the identification and the routing are realized by the wavelengths at nodes is expected to be a next generation network technique.

Figure 17:
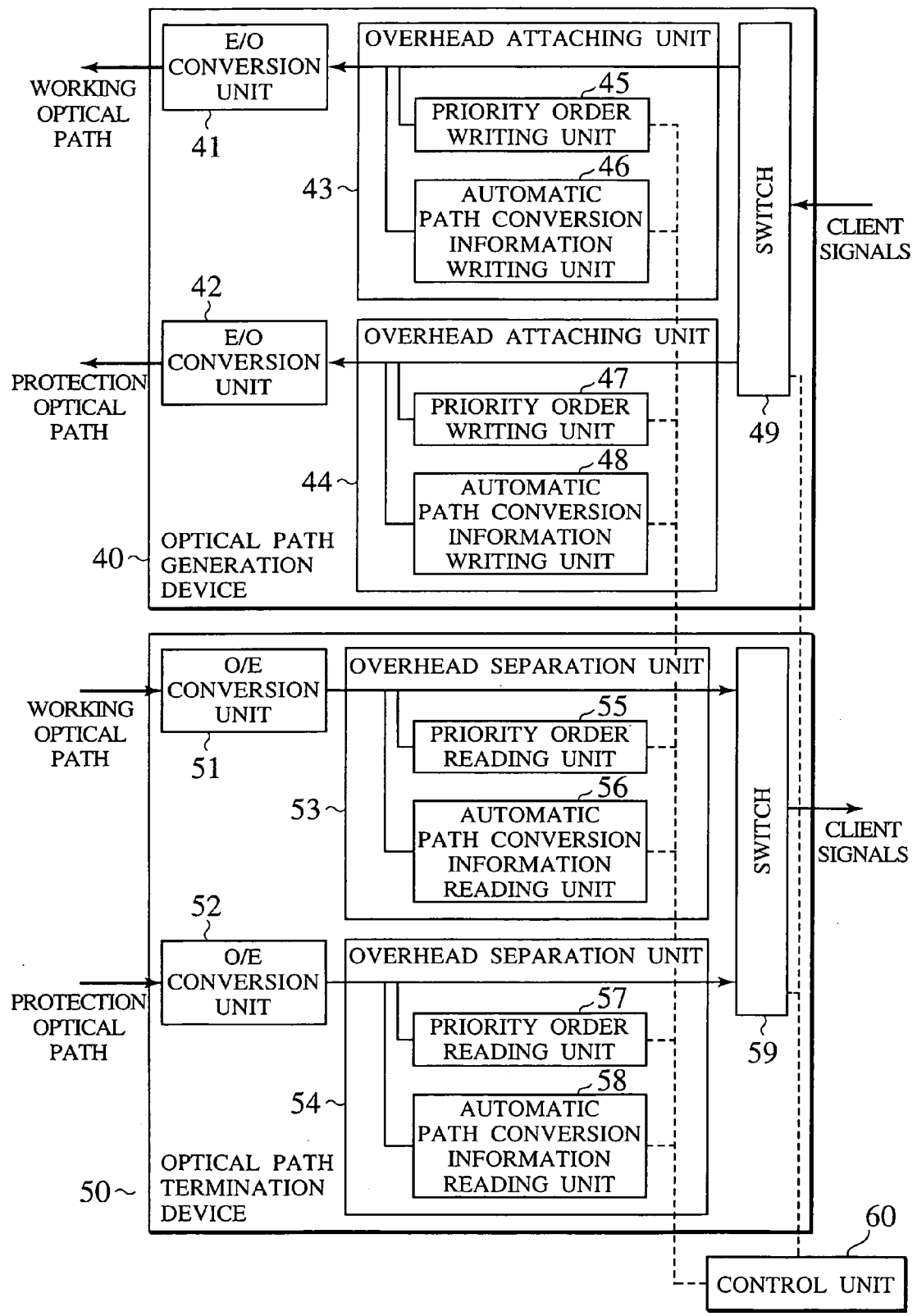
FIG. 17 is a block diagram showing an exemplary configuration of an optical path generation device and an optical path termination device that can be used in the node configuration shown in FIG. 12 to FIG. 15.

FIG. 17 shows an exemplary configuration of an optical path generation device and an optical path termination device that can be used as the path generation unit and the path termination unit in the node configuration of FIG. 12 to FIG. 15.

As shown in FIG. 17, the optical path generation device 40 comprises a switch 49 for switching client signals into working signals and protection signals according to a switching command from a control unit 60, an overhead attaching unit 43 for attaching an overhead to the working signals entered from the switch 49, an E/O conversion unit 41 for converting electric signals of the working signals entered from the overhead attaching unit 43 into optical path signals and transmitting the obtained optical path signals to a working optical path, an overhead attaching unit 44 for attaching an overhead to the protection signals entered from the switch 49, and an E/O conversion unit 42 for converting electric signals of the protection signals entered from the overhead attaching unit 44 and transmitting the obtained optical path signals to an protection optical path.

The overhead attaching unit 43 (44) has a priority order writing unit 45 (47) for writing a value of the priority order byte into the overhead according to a command from the control unit 60, and an automatic path conversion information writing unit 46 (48) for writing a value of the automatic path conversion byte into the overhead according to a command from the control unit 60.

Also, as shown in FIG. 17, the optical path termination device 50 comprises an O/E conversion unit 51 for converting the optical path signals received from the working optical path into electric signals of the working signals, an overhead separation unit 53 for separating the overhead from the working signals entered from the O/E conversion unit 51, an O/E conversion unit 52 for converting the optical path signals received from the protection optical path into electric signals of the protection signals, an overhead separation unit 54 for separating the overhead from the protection signals entered from the O/E conversion unit 52, and a switch 59 for switching the working signals and the protection signals entered from the overhead separation units 53 and 54 into the client signals according to a switching command from the control unit 60.

The overhead separation unit 53 (54) has a priority order reading unit 55 (57) for reading a value of the priority order byte from the overhead and transferring it to the control unit 60, and an automatic path conversion information reading unit 56 (58) for reading a value of the automatic path conversion byte from the overhead and transferring it to the control unit 60.

The control unit 60 controls the optical path generation device 40 and the optical path termination device 50. In the case of carrying out the automatic path conversion, the optical path generation device 40 and the optical path termination device 50 are controlled to realize the automatic path conversion according to the automatic path conversion byte and the priority order byte.

In the optical path generation device 40 of FIG. 17, the signals to be transmitted are first entered into the overhead attaching units 43 and 44 via the switch 49. At the overhead attaching unit 43 (44), the priority order writing unit 45 (47) writes the priority order information into the overhead, and the automatic path conversion information writing unit 46 (48) writes the automatic path conversion information into the overhead. The signals with the overhead attached at the overhead attaching unit 43 (44) are then converted from electric signals into optical signals at the E/O conversion unit 41 (42), and outputted as the optical path signals.

The signals transmitted through the working and protection optical paths are applied with a termination processing at the optical path termination device 50. First, the optical path signals are converted into electric signals at the O/E conversion unit 51 (52), and the overhead is separated from the obtained electric signals at the overhead separation unit 53 (54). At the overhead separation unit 53 (54), the priority order information is read out by the priority order reading unit 55 (57), and the automatic path conversion information is read out by the automatic path conversion information reading unit 56 (58). The priority order information and the automatic path conversion information read out from the overhead are then transferred to the control unit 60, and interpreted there to carry out appropriate operations according to the priority order information and the automatic path conversion information. At a time of writing the priority order information and the automatic path conversion information into the overhead, commands are sent from the control unit 60 to the respective writing units.

It is to be noted that, a node in the path network generally has a configuration combining that of the transmitting node and that of the receiving node as described above so that it can function as either the transmitting node or the receiving node according to the need.

As described, according to the present invention, it is possible to provide a path network and a path network operation method which are capable of dealing with the bandwidth increase request due to an abrupt traffic variation by temporarily utilizing a protection path as a working path, in view of the fact that the path network provides protection paths in correspondence to working paths in most cases.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for operating a path network for carrying out communications between nodes using one or more working paths and one or more protection paths, the method comprising the steps of:
   transmitting path signals from a transmitting node to a receiving node through the working paths and the protection paths;
   converting one of the protection paths into a working path temporarily in order to increase a bandwidth of the working paths when a bandwidth increase request occurs in the path network;
   adding protection paths in order to increase a bandwidth of the protection paths; and
   re-arranging the working paths and the protection paths such that all the working paths connect the transmitting node and the receiving node via a first route and all the protection paths connect the transmitting node and the receiving node via a second route.

2. The method of claim 1, wherein at the transmitting step, the transmitting node transmits the path signals obtained by attaching a path overhead to client signals, where the path overhead contains an automatic path conversion information to be used in converting a protection path into a working path, and
   at the converting step, the transmitting node and the receiving node convert the protection path into a working path by using the automatic path conversion information contained in the path overhead.

3. The method of claim 2, wherein the converting step further comprises the steps of:
   at the transmitting node, transmitting the path signals with the path overhead that contains the automatic path conversion information indicating a protection path conversion request for requesting a conversion of the protection path into a working path to the receiving node;
   at the receiving node, in response to the protection path conversion request, reserving an output terminal at a receiving side, connecting an input of the output terminal to a path from which the protection path conversion request is received, and returning the path signals with the path overhead that contains the automatic path conversion information indicating a protection path conversion reverse request for requesting transmission of signals through a converted path to the transmitting node; and
   at the transmitting node, in response to the protection path conversion reverse request, transmitting the path signals with the path overhead that contains the automatic path conversion information indicating a protection path conversion complete notice to the receiving node, through the converted path.

4. The method of claim 1, further comprising the steps of:
   assigning priority orders among the working paths and the protection paths in advance, such that the converting step converts a protection path with a highest priority order into a working path;
   wherein the rearranging step re-arranges the working paths and the protection paths by re-assigning the priority orders among the working paths and the protection paths.

5. The method of claim 4, wherein at the transmitting step, the transmitting node transmits the path signals obtained by attaching a path overhead to client signals, through each one of the working paths and the protection paths, where the path overhead attached to the path signals to be transmitted through each path contains a priority order information indicating a priority order of each path, and
   at the converting step, the transmitting node and the receiving node convert the protection path into a working path by using the priority order information contained in the path overhead attached to the path signals transmitted through each path.

6. The method of claim 1, further comprising the step of:
   releasing a part of the working paths and the protection paths in order to reduce a bandwidth of the working paths and the protection paths when a required bandwidth in the path network decreases.

7. A path network for carrying out communications between nodes, comprising;
   a transmitting node for transmitting path signals;
   a receiving node for receiving the path signals;
   one or more working paths and one or more protection paths for transmitting path signals between the transmitting node and the receiving node;
   wherein the transmitting node and the receiving node have a function for converting one of the protection paths into a working path temporarily in order to increase a bandwidth of the working paths when a bandwidth increase request occurs in the path network; and
   a network management system for adding protection paths in order to increase a bandwidth of the protection paths after the conversion of the protection path into a working path, and re-arranging the working paths and the protection paths after an addition of the protection paths such that all the working paths connect the transmitting node and the receiving node via a first route and all the protection paths connect the transmitting node and the receiving node via a second route.

8. The path network of claim 7, wherein the transmitting node has path generation units for transmitting the path signals obtained by attaching a path overhead to client signals, where the path overhead contains an automatic path conversion information to be used in converting the protection path into a working path, and the receiving node has path termination units for applying a termination processing to the path overhead, such that the path generation units and the path termination units convert the protection path into a working path by using the automatic path conversion information contained in the path overhead.

9. The path network of claim 8, wherein the transmitting node has path generation units for transmitting the path signals with the path overhead that contains the automatic path conversion information indicating a protection path conversion request for requesting a conversion of the protection path into a working path to the receiving node;

the receiving node has path termination units for reserving an output terminal at a receiving side, connecting an input of the output terminal to a path from which the protection path conversion request is received, and returning the path signals with the path overhead that contains the automatic path conversion information indicating a protection path conversion reverse request for requesting transmission of signals through a converted path to the transmitting node, in response to the protection path conversion request; and the path generation units of the transmitting node also transmit the path signals with the path overhead that contains the automatic path conversion information indicating a protection path conversion complete notice to the receiving node, through the converted path, in response to the protection path conversion reverse request.

10. The path network of claim 7, wherein the network management system also assigns priority orders among the working paths and the protection paths in advance, such that the transmitting node and the receiving node convert a protection path with a highest priority order into a working path, and re-arranges the working paths and the protection paths by reassigning the priority orders among the working paths and the protection paths.

11. The path network of claim 10, wherein the transmitting node has path generation units for transmitting the path signals obtained by attaching a path overhead to client signals, through each one of the working paths and the protection paths, where the path overhead attached to the path signals to be transmitted through each path contains a priority order information indicating a priority order of each path, and the receiving node has path termination units for applying a termination processing to the path overhead, such that the path generation units and the path termination units convert a protection path into a working path by using the priority order information contained in the path overhead attached to the path signals transmitted through each path.

12. The path network of claim 7, wherein the transmitting node and the receiving node also have a function for releasing a part of the working paths and the protection paths in order to reduce a bandwidth of the working paths and the protection paths when a required bandwidth in the path network decreases.

13. A node device functioning as a transmitting node in a path network for carrying out communications between nodes using one or more working paths and one or more protection paths, the node device comprising:

a plurality of path generation units, each path generation unit transmits path signals obtained by attaching a path overhead to client signals, where the path overhead contains an automatic path conversion information to be used in converting one of the protection paths into a working path, such that the protection path is converted into a working path temporarily by using the automatic path conversion information contained in the path overhead, in order to increase a bandwidth of the working paths when a bandwidth increase request occurs in the path network, wherein once a protection path has been converted into a working path, an additional protection path is added in order to increase a bandwidth of the protection paths, and the working paths and the protection paths are rearranged after the addition of the additional protection path such that all the working paths connect the transmitting node and the receiving node via a first route and all the protection paths connect the transmitting node and the receiving node via a second route;

a plurality of multiplexing units, each multiplexing unit multiplexes the path signals to be transmitted through each route and transmits multiplexed path signals through each route; and a switch unit for switching the path signals transmitted by the path generation units into the multiplexing units.

14. The node device of claim 13, wherein at a time of converting the protection path into a working path, the path generation units transmit the path signals with the path overhead that contains the automatic path conversion information indicating a protection path conversion request for requesting a conversion of a protection path into a working path to the receiving node, and when the transmission node receives the path signals with the path overhead that contains the automatic path conversion information indicating a protection path conversion reverse request for requesting transmission of signals through a converted path to the transmitting node, that is returned from the receiving node in response to the protection path conversion request, the path generation units transmit the path signals with the path overhead that contains the automatic path conversion information indicating a protection path conversion complete notice to the receiving node, through the converted path, in response to the protection path conversion reverse request.

15. The node device of claim 13, wherein each path generation unit attaches the path overhead that also contains a priority order information indicating a priority order of each path to the path signals to be transmitted through each path, such that the transmitting node and the receiving node convert the protection path into a working path by using the priority order information contained in the path overhead attached to the path signals transmitted through each path.

16. A node device functioning as a receiving node in a path network for carrying out communications between nodes using one or more working paths and one or more protection paths, the node device comprising:

a plurality of path termination units, each path termination unit applies a termination processing to a path overhead attached to path signals received from a transmitting node, where the path overhead contains an automatic path conversion information to be used in converting one of the protection paths into a working path, such that the protection path is converted into a working path temporarily by using the automatic path conversion information contained in the path overhead, in order to increase a bandwidth of the working paths when a bandwidth increase request occurs in the path network, wherein once a protection path has been converted into a working path, an additional protection path is added in order to increase a bandwidth of the protection paths, and the working paths and the protection paths are rearranged after the addition of the additional protection path such that all the working paths connect the transmitting node and the receiving node via a first route and all the protection paths connect the transmitting node and the receiving node via a second route;

a plurality of demultiplexing units, each demultiplexing unit demultiplexes multiplexed path signals transmitted through each route into path signals for each path; and a switch unit for switching the path signals for each path obtained by the demultiplexing units into the path termination units.

17. The path network of claim 16, wherein at a time of converting the protection path into a working path, when the receiving node receives the path signals with the path overhead that contains the automatic path conversion information indicating a protection path conversion request for requesting a conversion of a protection path into a working path from the transmitting node, the path termination units reserve an output terminal at a receiving side, connect an input of the output terminal to a path from which the protection path conversion request is received, and return the path signals with the path overhead that contains the automatic path conversion information indicating a protection path conversion reverse request for requesting transmission of signals through a converted path to the transmitting node, in response to the protection path conversion request, and receive the path signals with the path overhead that contains the automatic path conversion information indicating a protection path conversion complete notice from the transmitting node, through the converted path, in response to the protection path conversion reverse request.

18. The node device of claim 16, wherein each path termination unit applies the termination processing to the path overhead attached to the path signals for each path that also contains a priority order information indicating a priority order of each path, such that the transmitting node and the receiving node convert the protection path into a working path by using the priority order information contained in the path overhead attached to the path signals transmitted through each path.

* * * * *